United States Patent
Tanida

(10) Patent No.: US 11,752,803 B2
(45) Date of Patent: Sep. 12, 2023

(54) TIRE

(71) Applicant: Sumitomo Rubber Industries, Ltd., Hyogo (JP)

(72) Inventor: Ken Tanida, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 223 days.

(21) Appl. No.: 17/030,773

(22) Filed: Sep. 24, 2020

(65) Prior Publication Data

US 2021/0107319 A1   Apr. 15, 2021

(30) Foreign Application Priority Data

Oct. 10, 2019   (JP) ................ 2019-187045

(51) Int. Cl.
*B60C 11/13*   (2006.01)
*B60C 11/11*   (2006.01)
*B60C 11/12*   (2006.01)
*B60C 11/03*   (2006.01)

(52) U.S. Cl.
CPC ......... *B60C 11/0306* (2013.01); *B60C 11/11* (2013.01); *B60C 11/1204* (2013.01); *B60C 11/1236* (2013.01); *B60C 11/1307* (2013.01); *B60C 11/1384* (2013.01); *B60C 11/1392* (2013.01); *B60C 2011/0369* (2013.01);
(Continued)

(58) Field of Classification Search
CPC . B60C 11/11; B60C 11/1204; B60C 11/1236; B60C 11/1315; B60C 11/1392; B60C 11/1307; B60C 11/1384; B60C 2011/0369; B60C 2011/1213; B60C 2200/14
See application file for complete search history.

(56) References Cited

U.S. PATENT DOCUMENTS 5,957,180 A  *  9/1999  Kuramochi  .............. B60C 11/13
                                                          152/902
2010/0000643 A1 *  1/2010  Minoli  ................ B60C 11/1392
                                                          152/209.15
(Continued)

FOREIGN PATENT DOCUMENTS

GB   1588290 A  *  4/1981  .............. B60C 11/11
JP   02179508 A  *  7/1990  ......... B60C 11/0309
(Continued)

OTHER PUBLICATIONS

Machine translation of JP02-179508 (no date).*

*Primary Examiner* — Justin R Fischer
*Assistant Examiner* — Philip N Schwartz
(74) *Attorney, Agent, or Firm* — Greenblum & Bernstein, P.L.C.

(57) ABSTRACT

A tire includes a tread portion. The tread portion includes a pair of shoulder main grooves and a plurality of crown blocks. Each of the crown blocks includes a ground contacting surface, a chamfered portion arranged so as to surround the entire circumference of the ground contacting surface, and a main body portion arranged inside the chamfered portion in a tire radial direction. The main body portion is provided with at least one step-shaped portion that is bent stepwise in a transverse cross section orthogonal to the ground contacting surface.

18 Claims, 7 Drawing Sheets

(52) U.S. Cl.
CPC . *B60C 2011/1213* (2013.01); *B60C 2011/133* (2013.01); *B60C 2200/14* (2013.01)

(56) References Cited

U.S. PATENT DOCUMENTS

2018/0361798 A1   12/2018   Kurosawa
2019/0270346 A1*   9/2019   Kawauchi ........... B60C 11/1315

FOREIGN PATENT DOCUMENTS

| JP | 2001187520 A | * | 7/2001 | ......... B60C 11/1384 |
|----|--------------|---|--------|------------------------|
| JP | 2019-6371 A  |   | 1/2019 |                        |

* cited by examiner

TIRE

TECHNICAL FIELD

The present invention relates to a tire.

BACKGROUND ART

The following Patent Document 1 proposes a pneumatic tire suitable for off-road running. The pneumatic tire is expected to improve durability performance and steering stability performance on a dry road surface while maintaining off-road running performance on the basis of improving sipes provided in blocks.

PRIOR ART DOCUMENT

Patent Document

[Patent Document 1]
Unexamined Japanese Patent Application Publication No. 2019-006371

SUMMARY OF THE INVENTION

Problems to be Solved by the Invention

Tires designed for off-road running are required to have a high grip performance on a rocky road surface having a large number of large stones and, in contrast to it, on a snowy/muddy road surface having soft snow or mud. On the other hand, regarding the tire, it is necessary to consider the durability of the blocks.

The present invention was made in view of the above, and a primary object thereof is to provide a tire capable of exerting excellent grip performance on a rocky road surface or a snowy/muddy road surface while maintaining the durability of the blocks.

Means for Solving the Problems

The present invention is a tire including a tread portion, wherein the tread portion includes a pair of shoulder main grooves and a plurality of crown blocks formed between the pair of the shoulder main grooves, each of the crown blocks includes a ground contacting surface, a chamfered portion arranged so as to surround the entire circumference of the ground contacting surface, and a main body portion arranged inside the chamfered portion in a tire radial direction, and the main body portion is provided with at least one step-shaped portion that is bent stepwise in a transverse cross section orthogonal to the ground contacting surface.

In the present invention, it is preferred that the main body portion is provided with a plurality of the step-shaped portions.

In the present invention, it is preferred that, in the transverse cross section, a length in the tire radial direction of the chamfered portion is 15% or less of a maximum height in the tire radial direction of the crown block.

In the present invention, it is preferred that, in a plan view of the tread portion, a width of the chamfered portion is 15% or less of a maximum height in the tire radial direction of the crown block.

In the present invention, it is preferred that a length of the step-shaped portion along the ground contacting surface in the transverse cross section is 80% or more and 150% or less of a width of the chamfered portion in a plan view of the tread portion.

In the present invention, it is preferred that the number of steps of the step-shaped portion is 2 to 3.

In the present invention, it is preferred that the tread portion includes two crown blocks that are adjacent to each other with a sub groove between them, and each of the two crown blocks is provided with the step-shaped portion at a position facing the sub groove.

In the present invention, it is preferred that the crown blocks include first crown blocks and second crown blocks having different shapes from those of the first crown blocks.

In the present invention, it is preferred that the tread portion includes a plurality of the crown blocks each provided with a plurality of the step-shaped portions.

Effects of the Invention

Each of the crown blocks of the present invention includes the ground contacting surface, the chamfered portion arranged so as to surround the entire circumference of the ground contacting surface, and the main body portion arranged radially inside the chamfered portion. The chamfered portion suppresses the local chipping of the crown block and suppresses cracks originating from the local chipping, therefore, durability is improved over a long period of time. Further, the crown block 9 has a high ground contact on a rocky road surface, therefore, excellent grip performance is exerted.

In the present invention, the main body portion is provided with at least one step-shaped portion that is bent stepwise in the transverse cross section orthogonal to the ground contacting surface. The crown block provided with the step-shaped portion configured as such shears snow and mud by the step-shaped portion to provide large traction during running on a snowy/muddy road surface. Further, the step-shaped portion increases bending rigidity of the crown block and helps to further improve the durability of the block.

MODE FOR CARRYING OUT THE INVENTION

An embodiment of the present invention will now be described in conjunction with accompanying drawings.

Figure 1:
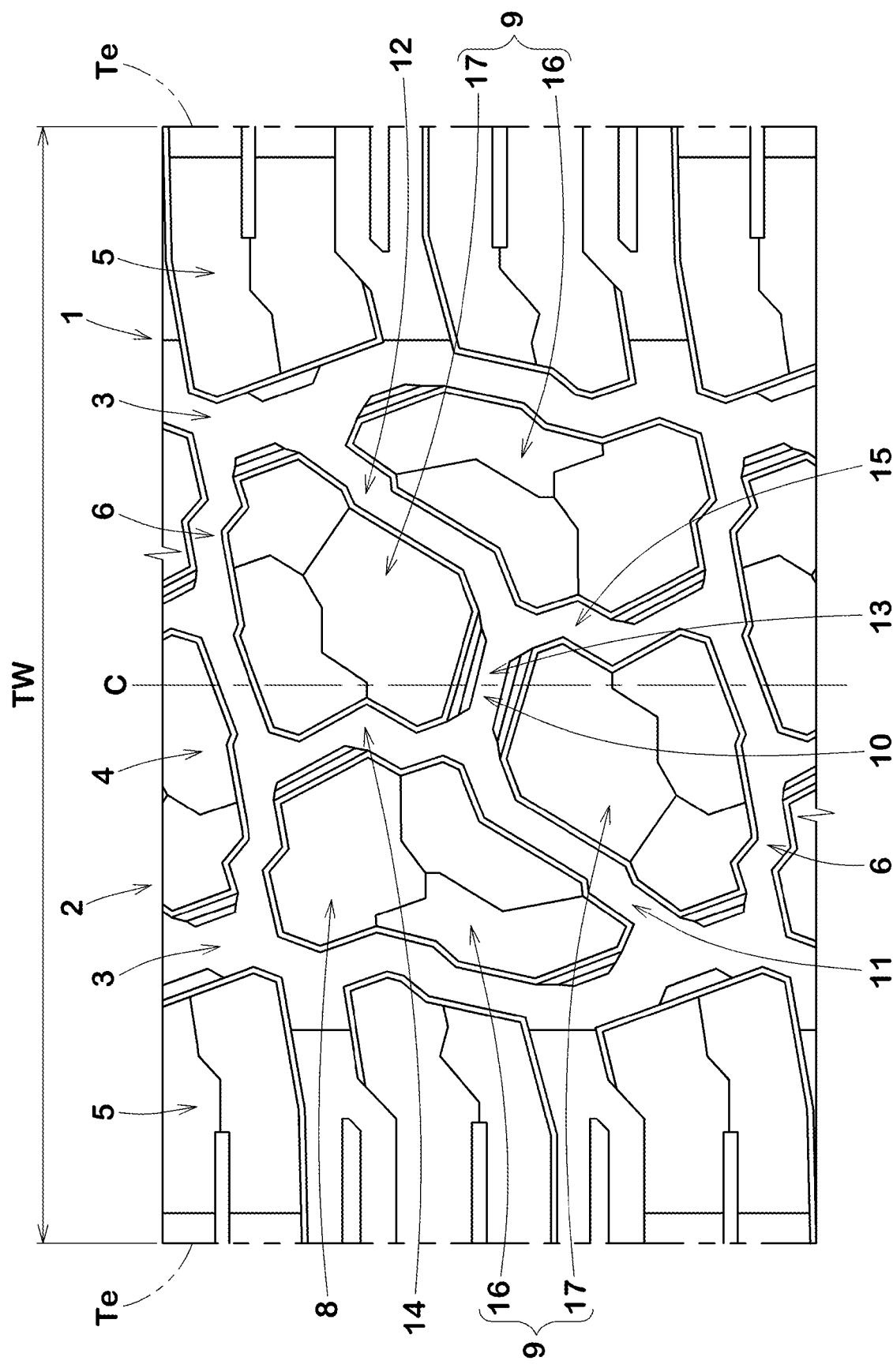
FIG. 1 a development view of a tread portion of a tire according to an embodiment of the present invention.

FIG. 1 is a development view of a tread portion 2 of a tire 1 according to the present embodiment (hereinafter, may be simply referred to as "tire 1"). As shown in FIG. 1, the tire 1 of the present embodiment is suitably used as a pneumatic tire for SUVs which are expected to run off-road, for example. However, the tire 1 of the present invention is not limited to such an embodiment.

The tread portion 2 of the tire 1 of the present embodiment includes a pair of shoulder main grooves 3 provided so as to sandwich a tire equator (C), a crown region 4 defined between the pair of the shoulder main grooves 3, and a pair of shoulder regions 5 arranged on both outer sides of the pair of the shoulder main grooves 3.

The shoulder main grooves 3 extend continuously in a tire circumferential direction. The shoulder main grooves 3 of the present embodiment extend in a zigzag shape in the tire circumferential direction. It is preferred that a distance in a tire axial direction from the tire equator (C) to a groove center line of each of the shoulder main grooves 3 is not less than 0.20 times and not more than 0.30 times a tread width (TW), for example. The tread width (TW) is a distance in the tire axial direction from one of tread edges (Te) to the other one of the tread edges (Te) in a standard state.

The "tread edges (Te)" are axially outermost ground contacting positions of the tire 1 when the tire 1 in the standard state is in contact with a flat surface with zero camber angle by being loaded with a standard tire load. The standard state is a state in which the tire 1 is mounted on a standard rim (not shown), inflated to a standard inner pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO.

The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in IRA, and "LOAD CAPACITY" in ETRTO.

It is preferred that each of groove widths of the shoulder main grooves 3 is 4% or more and 8% or less of the tread width (TW), for example. It is preferred that each of groove widths of the main grooves is 5 mm or more and 15 mm or less, for example.

A land ratio of the crown region 4 is 50% or more and 70% or less, for example. Each of land ratios of the shoulder regions 5 is 50% or more and 70% or less, for example. Thereby, in the crown region 4 and the shoulder regions 5, opening areas of grooves are secured while rigidity of the land regions is maintained. Therefore, anti-wear performance and off-road traction performance are improved. It should be noted that the "land ratio" in the present specification is a ratio of the actual ground contacting area with respect to an area of a virtual ground contacting surface obtained by filling the grooves and sipes.

In the present invention, the land ratio of the crown region 4 is set to be larger than the land ratio of the shoulder regions 5. Thereby, the protrusion of the crown region 4 when the tire is inflated is suppressed, therefore, uneven wear of the crown region 4 can be suppressed.

Figure 2:
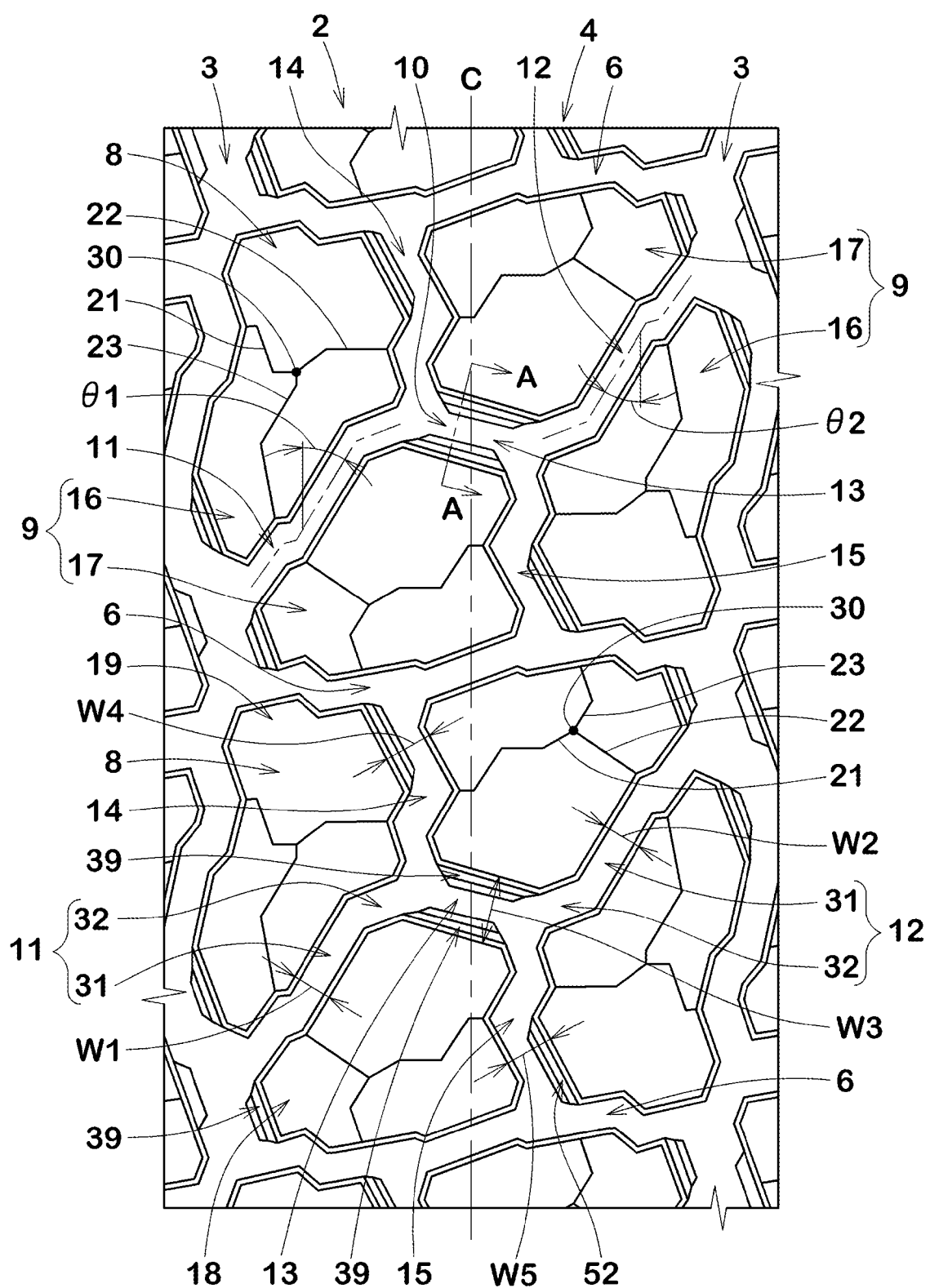
FIG. 2 an enlarged view of a crown region of FIG. 1.

In FIG. 2, an enlarged view of the crown region 4 is shown. As shown in FIG. 2, the crown region 4 includes a plurality of crown lateral grooves 6 each connecting the pair of the shoulder main grooves 3 and crown pattern elements 8 each defined between the crown lateral grooves 6 adjacent to each other in the tire circumferential direction. Each of the crown pattern elements 8 is divided into a plurality of crown blocks 9 by sub grooves 10. Each of the crown pattern elements 8 of the present embodiment includes four crown blocks 9. Each of the crown pattern elements 8 includes first crown blocks 16 and second crown blocks 17 having different shapes from those of the first crown blocks 16, for example.

Figure 3:
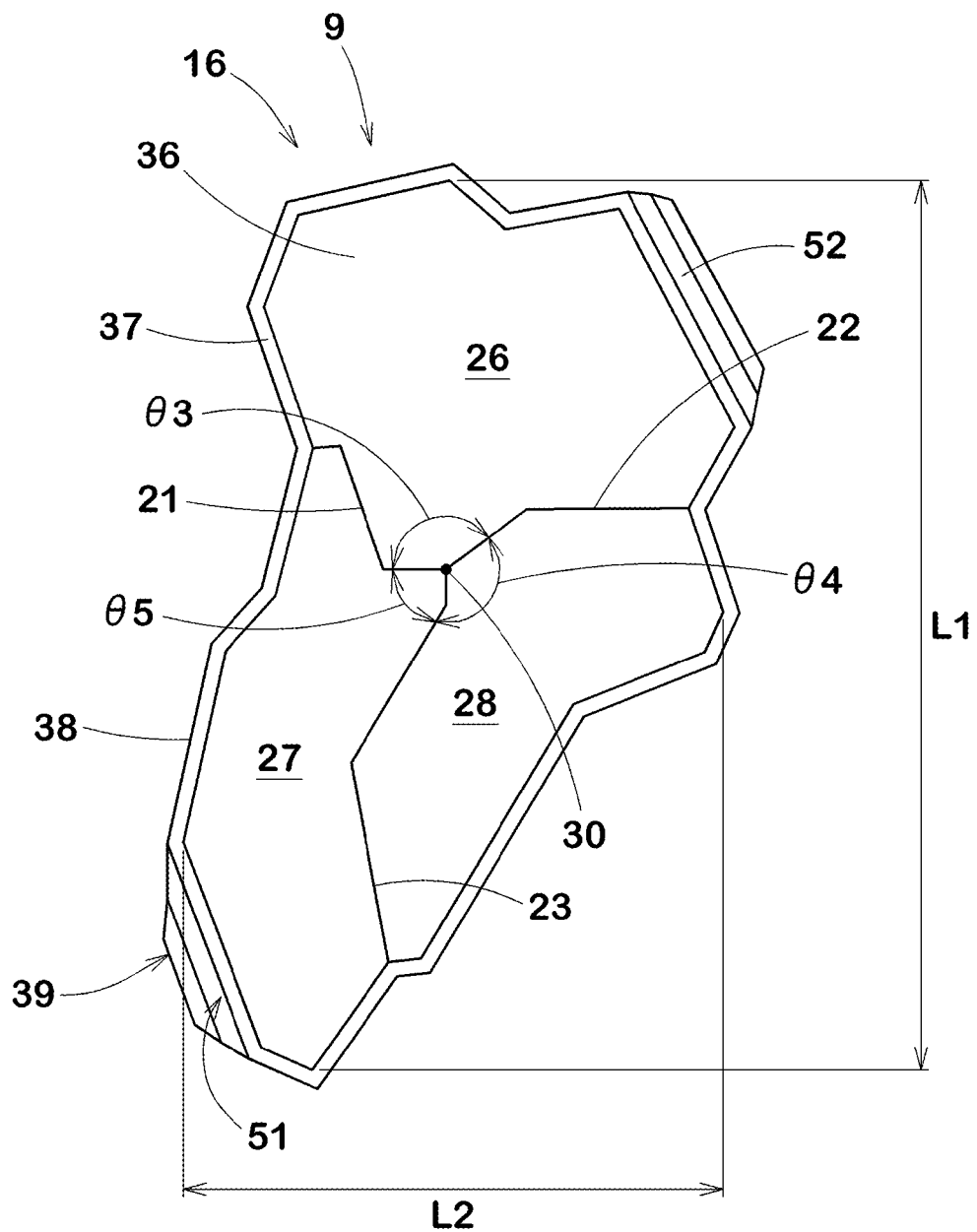
FIG. 3 an enlarged view of a first crown block of FIG. 2.

FIG. 3 shows an enlarged view of one of the first crown blocks 16 as an example of the crown block 9. As shown in FIG. 3, each of the crown blocks 9 includes a ground contacting surface 36, a chamfered portion 37 arranged so as to surround the entire circumference of the ground contacting surface 36, and a main body portion 38 arranged inside the chamfered portion 37 in a tire radial direction. It should be noted that the chamfered portion 37 includes an inclined surface arranged between the ground contacting surface 36 and the main body portion 38, and that the inclined surface is arranged at an angle larger than an outer surface of the main body portion 38 with respect to a normal line extending in the tire radial direction passing through an edge of the ground contacting surface 36.

The chamfered portion 37 suppresses the local chipping of the crown block 9 and suppresses cracks originating from it, therefore, the durability is improved over a long period of time. Further, the crown block 9 has the high ground contact on a rocky road surface, therefore, excellent grip performance is exerted.

Figure 4:
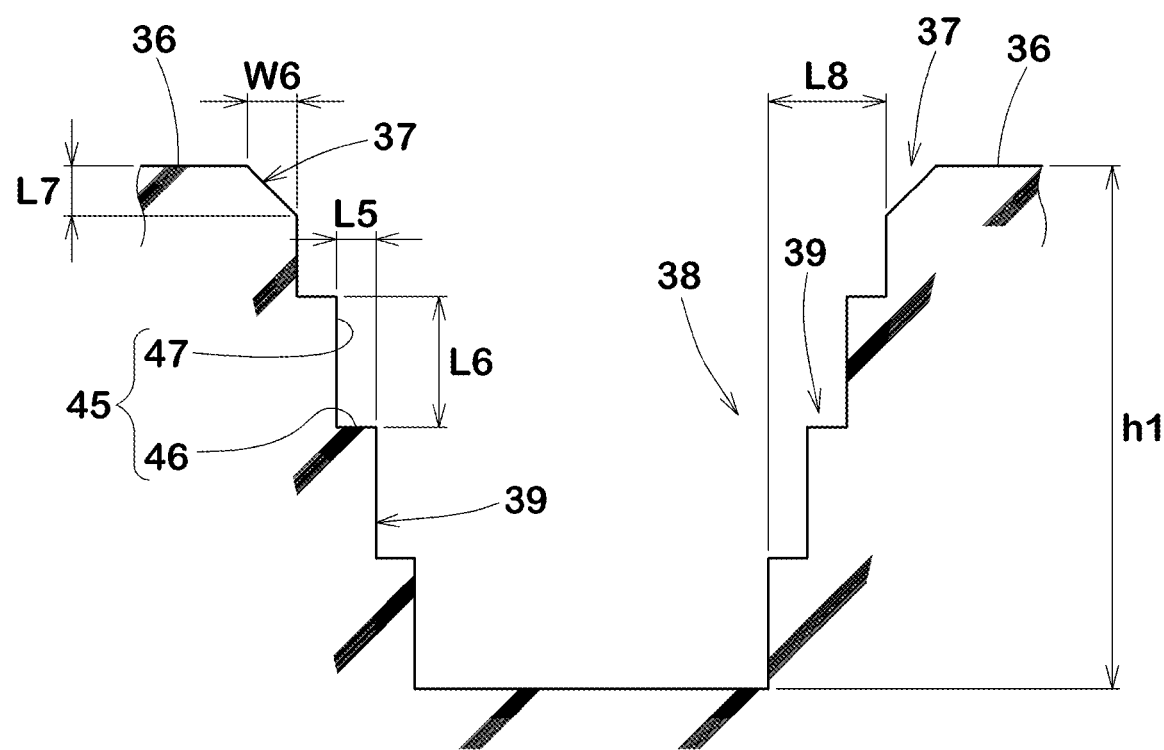
FIG. 4 a cross-sectional view taken along A-A line of FIG. 2.

FIG. 4 shows a cross-sectional view taken along A-A along of FIG. 3. As shown in FIG. 4, the main body portion 38 is provided with at least one step-shaped portion 39 that is bent stepwise in a transverse cross section orthogonal to the ground contacting surface 36. The crown block 9 provided with the step-shaped portion 39 configured as such shears snow and mud by the step-shaped portion 39 to provide great traction during running on a snowy/muddy road surface. Further, the step-shaped portion 39 increases the bending rigidity of the crown block 9 and helps to further improve the durability of the block.

The number of steps of the step-shaped portion 39 of the present embodiment is 2 to 3, for example. The step-shaped portion 39 is composed of a plurality of step elements 45 each formed by a lateral surface 46 extending along the ground contacting surface 36 and a vertical surface 47 extending along the tire radial direction, for example. In the preferred embodiment, the lateral surface 46 is arranged parallel to the ground contacting surface 36 and the vertical surface 47 is arranged parallel to the tire radial direction.

In the present embodiment, in each of the step elements 45, a length L5 of the lateral surface 46 in the direction along the ground contacting surface 36 is smaller than a length L6 of the vertical surface 47 in the tire radial direction. The length L5 of the lateral surface 46 is 20% or more and 40% or less of the length L6 of the vertical surface 47, for example. However, the present invention is not limited to such an embodiment.

A width W6 of the chamfered portion 37 in a plan view of the tread portion is 15% or less, and preferably 5% or more and 15% or less, of a maximum height (h1) in the tire radial direction of the crown block 9. Further, in the transverse section mentioned above, a length L7 in the tire radial direction of the chamfered portion 37 is 15% or less, and preferably 5% or more and 15% or less, of the maximum height (h1) in the tire radial direction of the crown block 9. The chamfered portion 37 configured as such is helpful for improving the grip performance on a rocky road surface and the durability of the block in a good balance.

It is preferred that a length L8 of the step-shaped portion 39 in the direction along the ground contacting surface 36 is 80% or more and 150% or less of the width W6 of the chamfered portion 37 in the plan view of the tread portion. The step-shaped portion 39 configured as such is helpful for improving the grip performance on a snowy/muddy road surface while ensuring the volume of the groove adjacent thereto.

As shown in FIG. 2, a plurality of the step-shaped portions 39 is provided in the main body portion 38 of the crown block 9 of the present embodiment. In a preferred embodiment, the tread portion 2 includes a plurality of the crown blocks 9 each provided with a plurality of the step-shaped portions 39. Thereby, the effects described above are further increased.

As shown in FIG. 3, each of the first crown blocks 16 of the present embodiment includes two step-shaped portions 39, for example. Specifically, each of the first crown blocks 16 includes a first step-shaped portion 51 facing the shoulder main groove 3 and a second step-shaped portion 52 facing the sub groove 10. The step-shaped portions 39 of the first crown blocks 16 are provided in portions extending in the tire circumferential direction, for example.

Figure 5:
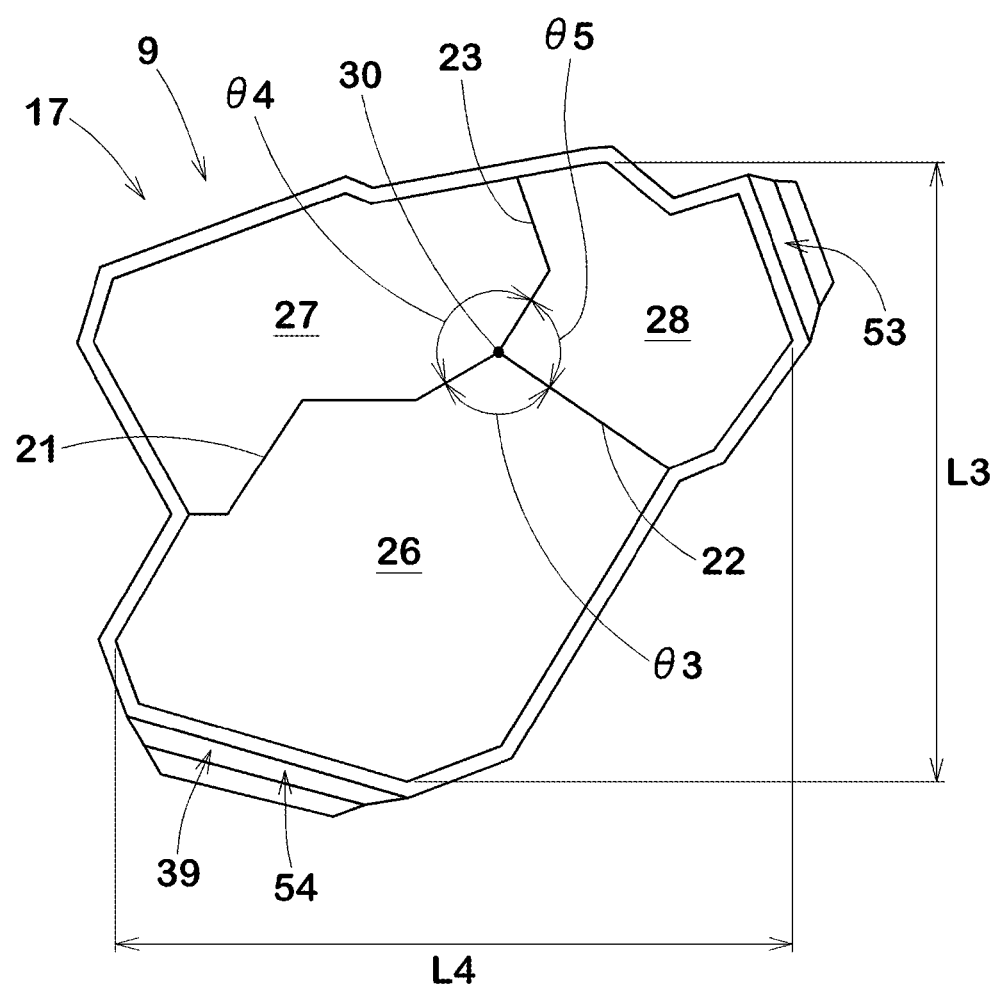
FIG. 5 an enlarged view of a second crown block of FIG. 2.

FIG. 5 shows an enlarged view of one of the second crown blocks 17. As shown in FIG. 5, each of the second crown blocks 17 of the present embodiment includes two step-shaped portions 39, for example. Specifically, each of the second crown blocks 17 includes a third step-shaped portion 53 facing the shoulder main groove 3 and a fourth step-shaped portion 54 facing the sub groove 10. The fourth step-shaped portion 54 is provided in a portion extending in the tire axial direction, for example.

As shown in FIG. 2, the tread portion 2 of the present embodiment includes two second crown blocks 17 that are adjacent to each other with one of the sub grooves 10 between them. Each of the two second crown blocks 17 is provided with the step-shaped portion 39 at a position facing the sub groove 10. Further, it is preferred that each of the sub grooves 10 sandwiched between the two second crown blocks 17 is provided on the tire equator (C). Such an arrangement of the step-shaped portions 39 can further improve the grip performance on a snowy/muddy mud road surface.

Each of the crown lateral grooves 6 extends at an angle of zero degrees or more and 15 degrees or less with respect to the tire axial direction, for example. Each of the crown lateral grooves 6 of the present embodiment extends in the tire axial direction so as to include a bent portion.

The sub grooves 10 include first sub grooves 11 and second sub grooves 12, for example. The first sub grooves 11 extend obliquely (upward to the right in FIG. 2) from one of the shoulder main grooves 3. The second sub grooves 12 extend obliquely (downward to the left in FIG. 2) from the other one of the shoulder main grooves 3. The first sub grooves 11 and the second sub grooves 12 of the present embodiment are inclined to the same side with respect to the tire axial direction. The first sub grooves 11 and the second sub grooves 12 of the present embodiment extend obliquely so as to include bent portions.

It is preferred that each of angles θ1 of the first sub grooves 11 with respect to the tire circumferential direction and angles θ2 of the second sub grooves 12 with respect to the tire circumferential direction is 30 degrees or more and 60 degrees or less. The first sub grooves 11 and the second sub grooves 12 configured as such are helpful for suppressing pitch noise on a paved road while maintaining the off-road traction performance.

In order to further increase the effects described above, each of the first sub grooves 11 and the second sub grooves 12 has a steeply inclined portion 31 connected with a respective one of the shoulder main grooves 3 and a gently inclined portion 32 having an angle with respect to the tire circumferential direction larger than that of the steeply inclined portion 31.

The sub grooves 10 include third sub grooves 13 each connecting a respective one of the first sub grooves 11 and a respective one of the second sub grooves 12. The third sub grooves 13 of the present embodiment connect the gently inclined portions 32 of the first sub grooves 11 and the gently inclined portions 32 of the second sub grooves 12. Further, the third sub grooves 13 cross the tire equator (C). The third sub grooves 13 configured as such provide frictional force in different directions from the first sub grooves 11 and the second sub grooves 12 when running off-road, therefore, off-road performance is improved.

The third sub grooves 13 are inclined to the side opposite to the first sub grooves 11 and the second sub grooves 12 with respect to the tire axial direction. Each of angles of the third sub grooves 13 with respect to the tire axial direction is 10 degrees or more and 20 degrees or less, for example.

It is preferred that each of groove widths W3 of the third sub grooves 13 is larger than each of groove widths W1 of the first sub grooves 11 and groove widths W2 of the second sub grooves 12. Specifically, each of the groove widths W3 of the third sub grooves 13 is 1.50 to 2.00 times each of the groove widths W1 of the first sub grooves 11 or each of the groove widths W2 of the second sub grooves 12. The third sub grooves 13 configured as such take in a lot of mud and dirt inside during running off-road to provide reactional force.

In the present embodiment, the fourth step-shaped portions 54 (shown in FIG. 5) of the second crown blocks 17 are formed as groove walls on both sides of each of the third sub grooves 13.

The sub grooves 10 of the present embodiment include fourth sub grooves 14 and fifth sub grooves 15. The fourth sub grooves 14 extend from the first sub grooves 11 or the third sub grooves 13 to one side in the tire circumferential direction to be connected with the crown lateral grooves 6. In each of the fourth sub grooves 14 of the present embodiment, one of groove edges is connected with a groove edge of the first sub groove 11, and the other groove edge is connected with a groove edge of the third sub groove 13. The fifth sub grooves 15 extend from the second sub grooves 12 or the third sub grooves 13 to the other side in the tire circumferential direction to be connected with the crown lateral grooves 6. In each of the fifth sub grooves 15 of the present embodiment, one of groove edges is connected with a groove edge of the second sub groove 12, and the other groove edge is connected with a groove edge of the third sub groove 13. The fourth sub grooves 14 and the fifth sub grooves 15 are helpful for improving cornering characteristics when running off road.

It is preferred that each of the fourth sub grooves 14 and the fifth sub grooves 15 extends in a zigzag shape. It is preferred that each of groove widths W4 of the fourth sub grooves 14 and groove widths W5 of the fifth sub grooves 15 is smaller than each of the groove widths W3 of the third sub grooves 13. Specifically, each of the groove widths W4 of the fourth sub grooves 14 and the groove widths W5 of the fifth sub grooves 15 is 0.60 to 0.80 times each of the groove widths W3 of the third sub grooves 13. The fourth sub grooves 14 and the fifth sub grooves 15 configured as such can maintain the rigidity in the tire axial direction of the crown pattern elements 8, therefore, an excessive decrease in the anti-wear performance can be suppressed.

One of groove walls of each of the fourth sub grooves 14 of the present embodiment is formed by the second step-shaped portion 52 (shown in FIG. 3) of a respective one of the first crown blocks 16. Further, one of groove walls of each of the fifth sub grooves 15 is formed by the second step-shaped portion 52 of a respective one of the first crown blocks 16.

As shown in FIG. 3, it is preferred that each of lengths L1 in the tire circumferential direction of the first crown blocks 16 is larger than each of lengths L2 in the tire axial direction of the first crown blocks 16. Each of the lengths L2 in the tire axial direction of the first crown blocks 16 is 0.50 to 0.70 times each of the lengths L1 in the tire circumferential direction of the first crown blocks 16, for example. The first crown blocks 16 configured as such provide large frictional force in the tire axial direction, therefore, off-road cornering performance is improved. Further, the first crown blocks 16 are easy to be moderately deformed in the tire axial direction, therefore, they are helpful for improving the cornering performance on a rocky road surface.

As shown in FIG. 5, it is preferred that each of lengths L3 in the tire circumferential direction of the second crown blocks 17 is smaller than each of lengths L4 in the tire axial direction of the second crown blocks 17. Each of the lengths L3 in the tire circumferential direction of the second crown blocks 17 is 0.80 to 0.95 times each of the lengths L4 in the tire axial direction, for example. The second crown blocks 17 configured as such improve the traction performance during running off-road while maintaining the anti-wear performance.

As shown in FIG. 2, in each of the crown pattern elements 8, the two first crown blocks 16 are arranged so as to be point-symmetrical to each other. Similarly, the two second crown blocks 17 are arranged so as to be point-symmetrical to each other. The crown pattern elements 8 configured as such are helpful for suppressing the occurrence of the uneven wear in various parts.

The plurality of the crown blocks 9 includes minimum blocks 18 having the smallest ground contacting surface areas among the plurality of the crown blocks, and maximum blocks 19 having the largest ground contacting surface areas among the crown blocks 9. Thereby, the minimum blocks 18 are relatively easily deformed, therefore, retention of mud or dirt in the sub grooves 10 during running off-road is suppressed. In the present embodiment, the first crown blocks 16 correspond to the maximum blocks 19 and the second crown blocks 17 correspond to the minimum blocks 18. Each of the ground contacting surface areas of the minimum blocks 18 is not less than 0.80 times each of the ground contacting surface areas of the maximum blocks 19. Thereby, the uneven wear is suppressed in each of the blocks.

As shown in FIG. 3, the ground contacting surface of at least one of the crown blocks 9 is provided with a first sipe 21, a second sipe 22, and a third sipe 23. In the present embodiment, each of the crown blocks 9 is provided with the first sipe 21, the second sipe 22, and the third sipe 23. In the present specification, a sipe means an incision having a width of 1.5 mm or less.

The first sipe 21, the second sipe 22, and the third sipe 23 are connected with each other at a single intersection 30. The first sipe 21, the second sipe 22, and the third sipe 23 terminate at the intersection 30. The first sipe 21, the second sipe 22, and the third sipe 23 extend from the intersection 30 in different directions. It should be noted that only the first sipe 21, the second sipe 22, and the third sipe 23 are connected with the intersection 30.

Each of the sipes configured as such deforms the block centering on the intersection while maintaining the rigidity of the block, thereby, the ground contact of the block on a road surface is improved. Therefore, the tire of the present embodiment can improve the traction performance especially on a rocky road surface while suppressing an excessive decrease in the anti-wear performance of the crown blocks 9.

As shown in FIG. 3 and FIG. 5, the first sipe 21, the second sipe 22 and the third sipe 23 of the present embodiment is connected with different edges of the ground contacting surface of the crown block 9. Thereby, the ground contacting surface of each of the crown blocks 9 includes a first surface 26, a second surface 27, and a third surface 28 divided by the first sipe 21, the second sipe 22, and the third sipe 23.

An area (S1) of the first surface 26 is larger than an area (S2) of the second surface 27 and an area (S3) of the third surface 28. The area (S1) of the first surface 26 is preferably not less than 0.65 times, more preferably not less than 0.73 times, and preferably not more than 1.45 times, more preferably not more than 1.36 times a total area obtained by adding the area (S2) of the second surface 27 and the area (S3) of the third surface 28. As a result, a block piece including the first surface 26 has a large rigidity, therefore, an excessive deformation of the block is suppressed.

It is preferred that the area (S2) of the second surface 27 is larger than the area (S3) of the third surface 28. The area (S3) of the third surface 28 is preferably not less than 0.60 times, more preferably not less than 0.66 times the area (S2) of the second surface 27. Thereby, the uneven wear of the second surface 27 and the third surface 28 is suppressed.

The first sipe 21 divides the first surface 26 and the second surface 27, and extends from the intersection 30 to one side in the tire axial direction. The second sipe 22 divides the first surface 26 and the third surface 28, and extends from the intersection 30 to the other side in the tire axial direction. The third sipe 23 divides the second surface 27 and the third surface 28, and extends from the intersection 30 to one side in the tire circumferential direction.

Specifically, as shown in FIG. 3, in each of the first crown blocks 16, the first sipe 21 extends from the intersection 30 to the left side, the second sipe 22 extends from the intersection 30 to the right side, and the third sipe 23 extends from the intersection 30 to the lower side. Further, as shown in FIG. 5, in each of the second crown blocks 17, the first sipe 21 extends from the intersection 30 to the left side, the second sipe 22 extends from the intersection 30 to the right side, and the third sipe 23 extends from the intersection 30 to the upper side.

The first surface 26 is defined on the other side in the tire circumferential direction of the first sipe 21 and the second sipe 22 (that is, the opposite side of the third sipe 23). As shown in FIG. 3 and FIG. 5, in each of the first crown blocks 16, the first surface 26 is defined on the upper side of the first sipe 21 and the second sipe 22, and in each of the second crown blocks 17, the first surface 26 is defined on the lower side of the first sipe 21 and the second sipe 22.

Each of the first sipe 21, the second sipe 22, and the third sipe 23 includes a portion that is bent at an angle of 90 degrees or more. The first sipe 21, the second sipe 22, and the third sipe 23 configured as such can provide frictional force in multiple directions and can exert excellent off-road performance especially on a rocky road surface. Further, each of the first sipe 21, the second sipe 22, and the third sipe 23 does not include a portion that is bent at an angle of less than 90 degrees. Thereby, the uneven wear of the ground contacting surface of the block is suppressed.

At the intersection 30, it is preferred that an angle θ3 between the first sipe 21 and the second sipe 22 and an angle θ4 between the second sipe 22 and the third sipe 23, and an angle θ5 between the first sipe 21 and the third sipe 23 are different from each other. The angle θ3 is 115 degrees or more and 150 degrees or less, for example. The angle θ4 is 125 degrees or more and 155 degrees or less, for example. The angle θ5 is 80 degrees or more and 100 degrees or less, for example.

Figure 6:
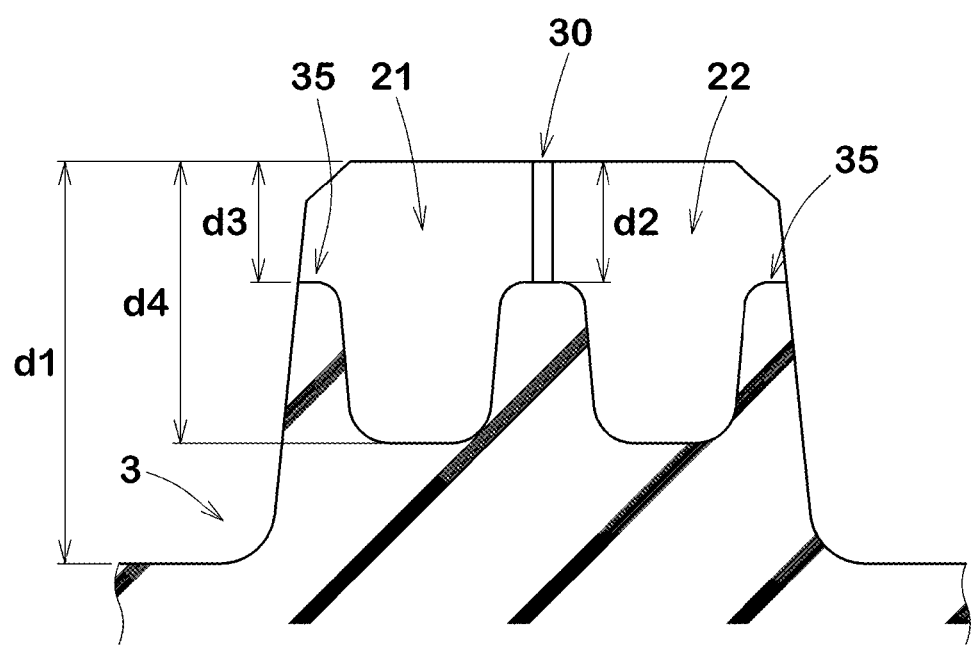
FIG. 6 a cross-sectional view of a crown block passing through a first sipe and a second sipe.

FIG. 6 is a lateral cross-sectional view of one of the crown blocks 9 passing through the first sipe 21 and the second sipe 22. As shown in FIG. 6, it is preferred that each of depths (d2) of the sipes at the intersection 30 is not less than 0.10 times and not more than 0.30 times each of depths (d1) of the shoulder main grooves 3. Thereby, the uneven wear in the vicinity of the intersection 30 is suppressed.

It is preferred that each of depths (d3) of the first sipe 21, the second sipe 22, and the third sipe 23 at a respective one of end portions 35 on a side of a respective one of the edges of the ground contacting surface is not less than 0.10 times and not more than 0.30 times each of the depths (d1) of the shoulder main grooves 3. Thereby, the uneven wear in the vicinity of the end portions 35 is suppressed.

It is preferred that a maximum depth (d4) of the first sipe 21, the second sipe 22, and the third sipe 23 is not less than 0.60 times and not more than 0.90 times each of the depths (d1) of the shoulder main grooves 3. Thereby, the anti-wear performance and the off-road traction performance are improved in a good balance.

Figure 7:
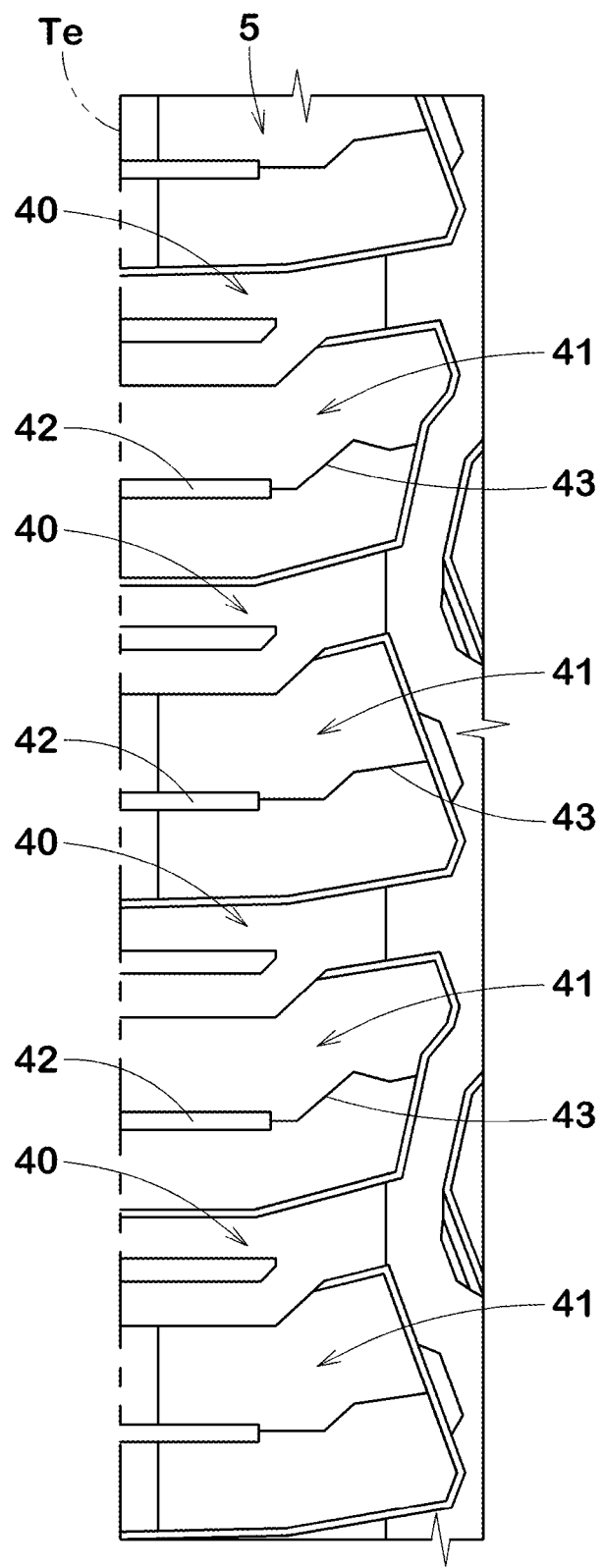
FIG. 7 an enlarged view of a shoulder region of FIG. 1.

FIG. 7 is an enlarged view of one of the shoulder regions 5. As shown in FIG. 7, each of the shoulder regions 5 includes a plurality of shoulder blocks 41 divided by a plurality of shoulder lateral grooves 40.

It is preferred that each of groove widths of the shoulder lateral grooves 40 is larger than each of groove widths of the crown lateral grooves 6, for example. It is preferred that each of the groove widths of the shoulder lateral grooves 40 gradually increases toward an adjacent one of the tread edges (Te), for example.

It is preferred that each of the shoulder blocks 41 is provided with a shoulder narrow groove 42 and a shoulder sipe 43, for example. The shoulder narrow groove 42 extends inward in the tire axial direction from the tread edge (Te) to terminate within the shoulder block 41. The shoulder sipe 43 extends from the shoulder narrow groove 42 to an adjacent one of the shoulder main grooves 3. It is preferred that the shoulder sipe 43 is partially bent, for example. The shoulder narrow grooves 42 and shoulder sipes 43 are useful for improving the off-road traction performance.

While detailed description has been made of the tire according to an embodiment of the present invention, the present invention can be embodied in various forms without being limited to the illustrated embodiment.

WORKING EXAMPLES (EXAMPLES)

Pneumatic tires of size 35×12.50R20LT having the basic pattern shown in FIG. 1 were made by way of test according to the specifications listed in Table 1. As Reference, tires in which the crown blocks did not include the chamfered portions and the step-shaped portions were made by way of test. The tires in the Reference had substantially the same configurations as the tire shown in FIG. 1 except for the configuration described above. The durability of the crown blocks, the grip performance on a rocky road surface, and the grip performance on a snowy/muddy road surface were tested for each of the test tires. Common specifications of the test tires and the test methods were as follows.

Test vehicle: 4WD-car with a displacement of 3500 cc
Test tire mounting position: all wheels
Tire rim: 20×10J
Tire inner pressure: 260 kPa for all wheels <Durability of Crown Block>

The degree of damage to the crown blocks was visually evaluated after the above-described test vehicle was driven on a rocky road surface and a snowy/muddy road surface each for a predetermined distance. The results are indicated by an evaluation point based on the degree of damage of the Reference being 100, wherein the larger the numerical value, the better the durability of the crown blocks.

<Grip Performance on Rocky Road Surface>

While a test driver drove the above-described test vehicle on a rocky road surface, the grip performance was evaluated by the test driver's feeling. The results are indicated by an evaluation point based on the grip performance of the Reference being 100, wherein the larger the numerical value, the better the grip performance on a rocky road surface is.

<Grip Performance on Snowy/Muddy Road Surface>

While the test driver drove the above-described test vehicle on a snowy/muddy road surface, the grip performance was evaluated by the test driver's feeling.

The results are indicated by an evaluation point based on the grip performance of the Reference being 100, wherein the larger the numerical value, the better the grip performance on a snowy/muddy road surface is.

The test results are shown in Table 1.

TABLE 1

|  | Ref. | Ex.1 | Ex.2 | Ex.3 | Ex.4 | Ex.5 | Ex.6 | Ex.7 | Ex.8 | Ex.9 |
| --- | --- | --- | --- | --- | --- | --- | --- | --- | --- | --- |
| Presence or Absence of Chamfered portion and Step-shaped portion | Absence | Presence | Presence | Presence | Presence | Presence | Presence | Presence | Presence | Presence |
| Width W6 of Chamfered portion/Maximum height (h1) of Crown block [%] | — | 10 | 5 | 8 | 12 | 15 | 10 | 10 | 10 | 10 |
| Length L7 of Chamfered portion/Maximum height (h1) of Crown block [%] | — | 10 | 5 | 8 | 12 | 15 | 10 | 10 | 10 | 10 |
| Length L8 of Step-shaped portion/Width W6 of Chamfered portion [%] | — | 135 | 135 | 135 | 135 | 135 | 80 | 100 | 150 | 165 |

TABLE 1-continued

|  | Ref. | Ex.1 | Ex.2 | Ex.3 | Ex.4 | Ex.5 | Ex.6 | Ex.7 | Ex.8 | Ex.9 |
| --- | --- | --- | --- | --- | --- | --- | --- | --- | --- | --- |
| Durability of Crown block [Evaluation point] | 100 | 105 | 103 | 104 | 105 | 106 | 104 | 105 | 105 | 104 |
| Grip performance on Rocky road surface [Evaluation point] | 100 | 108 | 105 | 106 | 108 | 108 | 108 | 108 | 108 | 107 |
| Grip performance on Snowy/muddy road surface [Evaluation point] | 100 | 108 | 108 | 108 | 107 | 106 | 105 | 106 | 108 | 109 |

As shown in Table 1, it was confirmed that each of the test tires exerted excellent grip performance on the rocky road surface and the snowy/muddy road surface while maintaining the durability of the crown blocks.

DESCRIPTION OF REFERENCE SIGNS 2 tread portion
3 shoulder main groove
9 crown block
36 ground contacting surface
37 chamfered portion
38 main body portion
39 step-shaped portion

The invention claimed is:

1. A tire comprising a tread portion, wherein
the tread portion includes a pair of shoulder main grooves and a plurality of crown blocks formed between the pair of the shoulder main grooves,
each of the crown blocks includes a ground contacting surface, a chamfered portion connected with the ground contacting surface and arranged immediately inside the ground contacting surface in a tire radial direction so as to surround the entire circumference of the ground contacting surface, and a main body portion extending radially from the chamfered portion to a radially inner end of the each of the crown blocks,
the main body portion is provided with at least one step-shaped portion that is bent stepwise in a transverse cross section orthogonal to the ground contacting surface,
the step-shaped portion is composed of a plurality of step elements each formed by a lateral surface extending along the ground contacting surface and a vertical surface extending along the tire radial direction,
the tread portion includes a plurality of crown lateral grooves each connecting the shoulder main grooves and crown pattern elements each defined between the crown lateral grooves adjacent to each other in a tire circumferential direction,
each of the crown pattern elements is divided into the crown blocks by sub grooves,
each of the crown blocks includes two step-portions,
one of the two step-shaped portions faces one of the shoulder main grooves and the other one of the two step-shaped portions faces one of the sub grooves,
in a plan view, each of the crown blocks has no step-shaped portion having a step-down direction perpendicular to a longitudinal direction of the lateral surface directed toward one of the crown lateral grooves,
the sub grooves include a first sub groove and a second sub groove,
the first sub groove extends obliquely from one of the shoulder main grooves so as to include a bent portion, and
the second sub groove extends obliquely from the other one of the shoulder main grooves so as to include a bent portion.

2. The tire according to claim 1, wherein
the main body portion is provided with a plurality of the step-shaped portions.

3. The tire according to claim 1, wherein
in the transverse cross section, a length in the tire radial direction of the chamfered portion is 15% or less of a maximum height in the tire radial direction of the crown block.

4. The tire according to claim 1, wherein
in a plan view of the tread portion, a width of the chamfered portion is 15% or less of a maximum height in the tire radial direction of the crown block.

5. The tire according to claim 1, wherein
a length of the step-shaped portion along the ground contacting surface in the transverse cross section is 80% or more and 150% or less of a width of the chamfered portion in a plan view of the tread portion.

6. The tire according to claim 1, wherein
the number of steps of the step-shaped portion is 2 to 3.

7. The tire according to claim 1, wherein
the tread portion includes two crown blocks that are adjacent to each other with a sub groove between them, and
each of the two crown blocks is provided with the step-shaped portion at a position facing the sub groove.

8. The tire according to claim 1, wherein
the crown blocks include first crown blocks and second crown blocks having different shapes from those of the first crown blocks.

9. The tire according to claim 1, wherein
the tread portion includes a plurality of the crown blocks each provided with a plurality of the step-shaped portions.

10. The tire according to claim 1, wherein
a length of the lateral surface along the ground contacting surface is smaller than a length of the vertical surface in the tire radial direction.

11. The tire according to claim 10, wherein
the length of the lateral surface is 20% or more and 40% or less of the length of the vertical surface.

12. The tire according to claim 3, wherein
in the transverse cross section, the length in the tire radial direction of the chamfered portion is 5% or more of the maximum height in the tire radial direction of the crown block.

13. The tire according to claim 4, wherein
in a plan view of the tread portion, the width of the chamfered portion is 5% or more of the maximum height in the tire radial direction of the crown block.

14. The tire according to claim 1, wherein
the first sub groove and the second sub groove are inclined to the same side with respect to a tire axial direction.

15. The tire according to claim 1, wherein
each of the first sub groove and the second sub groove has a steeply inclined portion connected with a respective one of the shoulder main grooves and a gently inclined portion having an angle with respect to the tire circumferential direction larger than that of the steeply inclined portion.

16. The tire according to claim 1, wherein
the sub grooves include a third sub groove connecting the first sub groove and the second sub groove.

17. The tire according to claim 16, wherein
the third sub groove is inclined to a side opposite to the first sub groove and the second sub groove with respect to a tire axial direction.

18. A tire comprising a tread portion, wherein
the tread portion includes a pair of shoulder main grooves and a plurality of crown blocks formed between the pair of the shoulder main grooves,
each of the crown blocks includes a ground contacting surface, a chamfered portion connected with the ground contacting surface and arranged immediately inside the ground contacting surface in a tire radial direction so as to surround the entire circumference of the ground contacting surface, and a main body portion extending radially from the chamfered portion to a radially inner end of the each of the crown blocks,
the main body portion is provided with at least one step-shaped portion that is bent stepwise in a transverse cross section orthogonal to the ground contacting surface,
the step-shaped portion is composed of a plurality of step elements each formed by a lateral surface extending along the ground contacting surface and a vertical surface extending along the tire radial direction,
the tread portion includes a plurality of crown lateral grooves each connecting the shoulder main grooves and crown pattern elements each defined between the crown lateral grooves adjacent to each other in a tire circumferential direction,
each of the crown pattern elements is divided into the crown blocks by sub grooves,
each of the crown blocks includes two step-portions,
one of the two step-shaped portions faces one of the shoulder main grooves and the other one of the two step-shaped portions faces one of the sub grooves,
the sub grooves include a first sub groove and a second sub groove,
the first sub groove extends obliquely from one of the shoulder main grooves so as to include a bent portion,
the second sub groove extends obliquely from the other one of the shoulder main grooves so as to include a bent portion, and
in a plan view, each of the crown blocks has no step-shaped portion having a step-down direction perpendicular to a longitudinal direction of the lateral surface directed toward the first sub groove or the second sub groove.

* * * * *